United States Patent
Zhu et al.

(10) Patent No.: US 6,732,606 B1
(45) Date of Patent: May 11, 2004

(54) POLISHED GEAR SURFACES

(75) Inventors: Dong Zhu, Farmington Hills, MI (US); Michael Bujold, Royal Oak, MI (US); Patrick Watts, Gastonia, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/607,958

(22) Filed: Jun. 30, 2000

(51) Int. Cl.⁷ .............................. F16H 1/04; F16H 57/04
(52) U.S. Cl. .............................. 74/460; 74/457; 74/467; 74/421 R
(58) Field of Search .............................. 74/459.5, 457, 74/423, 414, 421 R, 431, 443, 460, 467; 451/47, 219

(56) References Cited

U.S. PATENT DOCUMENTS

| | | |
|---|---|---|
| 3,955,327 A | 5/1976 | Franco ..................... 51/206 R |
| 4,491,500 A | 1/1985 | Michaud et al. ............. 156/628 |
| 4,597,304 A * | 7/1986 | Cataldo ....................... 74/325 |
| 4,818,333 A | 4/1989 | Michaud ..................... 156/628 |
| 5,126,609 A * | 6/1992 | Shimono et al. ........... 74/421 A |
| 5,503,481 A | 4/1996 | Hashimoto et al. ......... 384/569 |
| 5,624,301 A * | 4/1997 | Lenz et al. ................... 451/47 |
| 6,159,348 A * | 12/2000 | Barnsby et al. ........ 204/192.15 |

FOREIGN PATENT DOCUMENTS

| | | | |
|---|---|---|---|
| JP | 9-57385 | * | 3/1997 |
| JP | 2000-257697 | * | 9/2000 |

OTHER PUBLICATIONS

R. D. Britton et al., Effect of Surface Finish on Gear Tooth Friction, Jan. 2000, Trans AMSE Journal of Tribology, vol. 122, pp. 354–360.*

* cited by examiner

Primary Examiner—William C. Joyce
(74) Attorney, Agent, or Firm—Rader, Fishman & Grauer PLLC

(57) ABSTRACT

An optimally finished gear has a surface roughness between approximately 5 micro-inches Ra to 10 micro-inches Ra. The reduced surface roughness, when located at the gear teeth, can reduce the maximum contact stress by more than fifty percent. Similarly, the subsurface shear stress can be reduced by approximately thirty percent. The reduced contact stress and reduced shear stress results from improved lubrication conditions between the gear teeth. Surface roughness greater than 10 micro-inches Ra results in increased contact of the surface peaks, while surface roughness lower than 3 micro-inches is too smooth to retain adequate lubrication between the gear teeth.

10 Claims, 3 Drawing Sheets

FIG 1
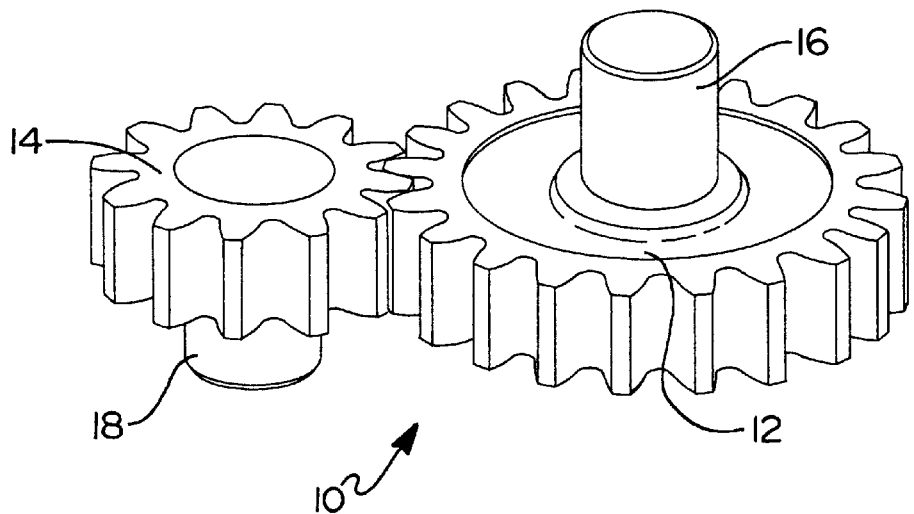
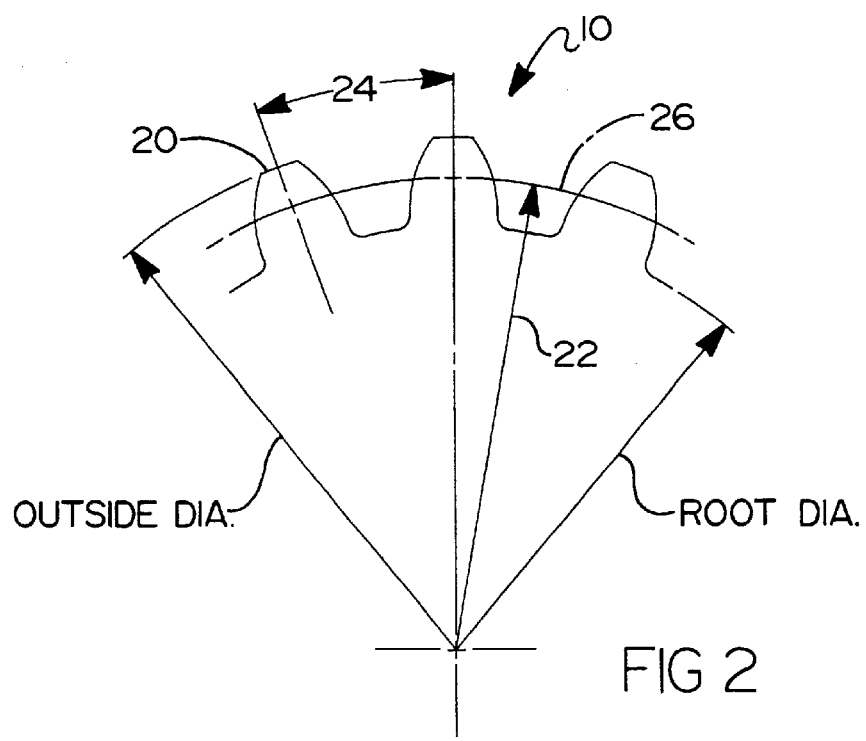
FIG 2

Ra=0.6988 μm, Rq=0.8864 μm, Rz=18.430 μm

Ra=0.1987 μm, Rq=0.3044 μm, Rz=10.04 μm

POLISHED GEAR SURFACES

FIELD OF THE INVENTION

The present invention relates generally to gears. More particularly, it relates to gears, for example transmission gears, having a reduced surface roughness resulting in increased contact fatigue life, improved wear resistance and improved performance.

BACKGROUND

Many methods of finishing gear teeth are known. For example, in gear hobbing and shaving, a gear is rotated in mesh with a gear-like cutter tool. The gear-like tool has cutting edges that extend up and down the sides of the teeth parallel to the plane of rotation. This is accompanied by a relative traverse between the gear and the cutter in a plane parallel to the axis of the gear and the cutter. The resulting finished surface roughness is in the range of 40 to 80 micro-inches Ra, where Ra is the arithmetic mean roughness.

Another method of finishing the teeth of a gear is known as gear grinding. In gear grinding, the resulting finished surface roughness is typically 15 to 35 micro-inches Ra.

In another method of gear finishing, a honing operation is performed. Here, the gear is rotated in mesh with a gear-shaped hone. Portions of the hone at the said of the gear teeth are fabricated from a plastic material that is relatively hard yet highly resilient. The honing operation occurs by rotating the hone in mesh with the gear while providing a traverse stroke parallel to the axis of the gear. This distributes the finishing action evenly throughout each gear tooth. The resulting roughness is typically 15 to 35 micro-inches Ra. Fine grit honing may yield surface roughness as low as 12 to 13 micro-inches Ra.

However, none of these finishing methods can improve the surface finish below approximately 10–12 micro-inches without significantly increasing the cost and process time.

Polishing compounds used for preparing metal parts for electroplating have been available, using liquid polishing compounds containing fine abrasive particulate. For example, U.S. Pat. No. 4,491,500 teaches a physicochemical process for refining metal surfaces. The disclosed two-step process first utilizes a liquid chemical followed by a burnishing liquid. It further involves the development of a relatively soft coating on the surface being treated, followed by the physical removal of the soft coating and continuous repair. Rougher areas greater than 70 $\mu$m are first leveled through some form of mechanical action. U.S. Pat. No. 4,818,333 describes a similar process, focusing on the composition of a high density burnishing media used in the process. These processes can result in finishes less than 3 micro-inches Ra. Thus, processes and chemicals are described for reducing surface roughness.

Chemical finishing techniques such as etching and bright dipping are also widely known in the art of electroplating preparation for the purpose of achieving an ultra-smooth and clean surface.

The main failure modes for gears are pitting or micropitting, wear and scuffing. When a gear and pinion interact, the gear teeth necessarily contact each other. Without lubrication, the teeth scratch against each other, scuff each other, wear down, pit and crack. Lubrication postpones the onset of these effects. Thus, the better the lubrication, the longer the life of the gear. Gears with surfaces that are too rough have surface peaks that will damage the gear teeth as they interact. Gears with surfaces that are too smooth, for example below 3 micro-inches Ra, cannot retain sufficient lubrication between adjacent teeth, resulting in an increased tooth wear rate.

Consequently, there is a need for gears having properly shaped teeth with improved surface finishes below approximately 10 micro-inches Ra in order to maximize the life and overall performance of gears.

SUMMARY OF THE INVENTION

The present invention is directed to a gear having a surface finish between approximately 5 micro-inches to approximately 10 micro-inches Ra for improved contact fatigue life, improved wear resistance, reduced friction and improved gear performance.

Most gears are manufactured using various gear cutting and shaping techniques, including hobbing and shaving, which result in surface roughness greater than 15 micro-inches Ra. Numerous methods exist for polishing metal surfaces in order to get a reduced surface roughness, including chemically accelerated vibratory polishing, electrochemical polishing, and mechanical polishing. When surface roughness is reduced to between approximately 5 micro-inches Ra to 10 micro-inches Ra, the maximum contact stress can be reduced more than fifty percent (50%). Similarly, the subsurface shear stress can be possibly reduced by approximately thirty percent (30%) to fifty percent (50%). The reduced contact stress and reduced shear stress results from improved lubrication conditions between the gear teeth. That is, the smoother the gear surface, and therefore the lower the roughness, the higher the film thickness ratio, $\lambda$, and the greater the overall lubrication. As the film thickness ratio is increased, the lubrication is better, therefore the friction is lower, and the surfaces are better separated with a layer of lubricant. As a result of both surfaces not having at most limited direct peak contact, the contact pressure and the subsurface stresses are reduced. Also, the heat generation and the temperature rise in the gear tooth contact will be reduced due to the fact that direct rough surface peak contact and robbing are the main cause of high friction and heat generation. Reduce operating temperature and better controlled thermal equilibrium condition would greatly improve customer satisfaction, increase life and reduce warranty cost for geared products such as transmissions. It will also reduce energy consumption and improve efficiency.

It is also possible, however, to have a gear that is too smooth. For example, a gear with a surface roughness of approximately 1 micro-inch Ra to approximately 3 micro-inch Ra is too smooth, resulting in reduced oil retention for lubrication. This is because the lubricant requires some degree of surface roughness from which to adhere.

BRIEF DESCRIPTION OF THE DRAWINGS

The preferred embodiments of this invention will be described in detail, with reference to the following figures, wherein:

FIG. 1 is a perspective view of a spur gear pair;

FIG. 2 is a partial side view of a spur gear depicting the different parts of the gear and teeth;

DETAILED DESCRIPTION OF THE PREFERRED EMBODIMENT

Figure 3:
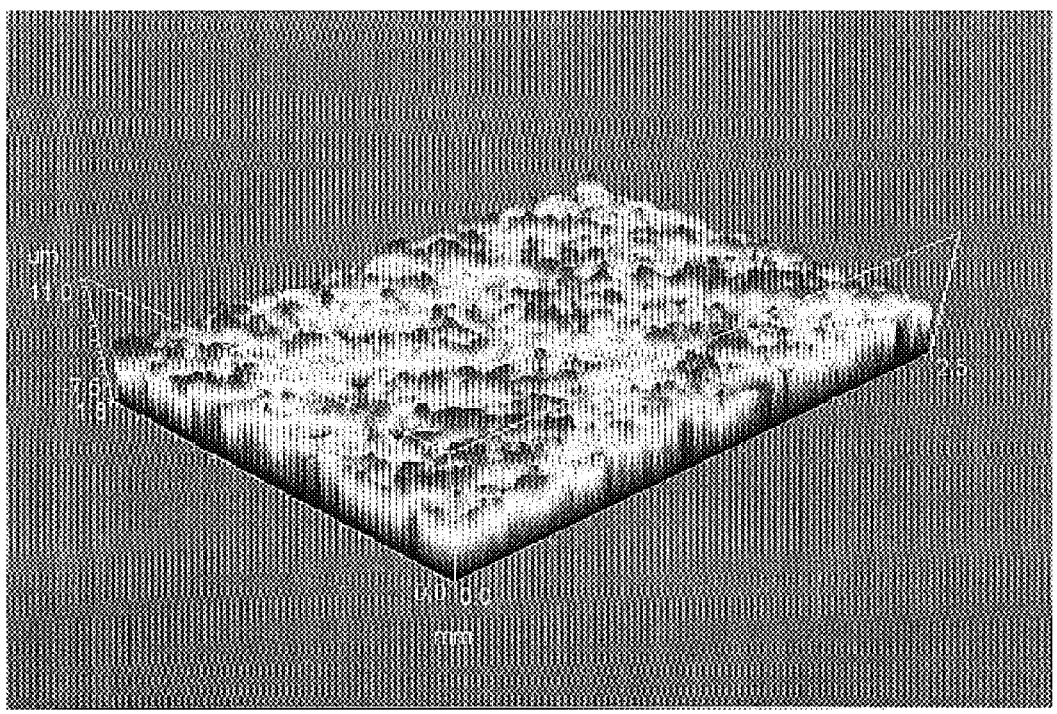
FIG. 3 shows a perspective of a surface with traditional hobbed and shaved surface finish.

FIG. 1 is a perspective view of a spur gear combination 10. Spur gear combinations 10 is made up of a gear 12 and a pinion 14. The pinion 14, by convention, is the smaller of the two gears. Spur gears 10 are used to transmit motion and power between parallel shafts 16, 18. The teeth 20 are generally straight and run generally parallel to the shaft axis.

FIG. 2 shows a partial side view of a spur gear depicting the different parts of the gear 12 and teeth 20. The pitch circle diameter 22 is the basis of measurement of gears 12, and represents the size of the gear. The circular pitch 24 is the distance from the center of one tooth 20 to the center of the next tooth measured around the circumference of the pitch circle 26. The diametrical pitch of the gear 12 is the number of teeth to one inch of the pitch diameter. For example, if a gear 12 has sixteen (16) teeth and the pitch diameter is four (4) inches, the gear has a four (4) teeth to each inch of its pitch diameter and is called 4 diametrical pitch, or 2 D.P.

Spur gears 10 are generally fabricated from cast iron, steel, bronze and brass, or other strong metals. However, they may also be fabricated using nylon or other plastics for silent running.

It will be understood by one of skill in the art that this invention relates to gears of different types, including, but not limited to, rack and pinion gear systems for converting rotary motion to linear motion; internal gear systems, helical gear systems, herringbone gear systems, bevel gear systems, worm gear systems and planetary gear systems.

Table 1 shows analysis results of different surface finishes and corresponding data, including roughness and film thickness. The composite roughness, $\sigma$, is given in microns. The film thickness ratio, $\lambda$, is the ratio of the average film thickness $h_a$ divided by the composite roughness. The contact load ratio, $W_c$, is the ratio of asperity contact load to total load. The maximum dimensionless pressure is calculated as $P/P_h$, where $P_h$ is the maximum Hertzian pressure. It can be readily seen that the lower the overall composite roughness, or arithmetic mean roughness, the higher the film thickness ratio, $\lambda$. Accordingly, a lower maximum pressure ratio and a lower maximum substrate shear stress is observed, as well as reduced contact load ratio and coefficients of friction. The smooth surface represents the ideal case and is for comparison. When the surface is ideally smooth, it has a calculated coefficient of friction of 0.02679, and there is little of any lubrication present because the surface is too smooth. Retention of sufficient lubrication on the gear surface is necessary for optimal gear wear. In contrast, when it is too rough, not enough lubrication is present, and increased surface peak interaction results. The result is greater lubrication of the gears, which corresponds to numerous benefits known to those skilled in the art including reduced stress on the gear and extended time to failure caused by fatigue. For example, gear fatigue life can be significantly improved from 11–12 hours before polishing to greater then 100 hours after polishing.

Accordingly, the optimum gear surface finish is between approximately 5 micro-inches and 10 micro-inches Ra. When surface roughness is reduced to between approximately 5 micro-inches Ra to 10 micro-inches Ra, the maximum contact stress can be reduced more than fifty percent (50%). Similarly, the subsurface shear stress can be reduced by approximately thirty percent (30%) to fifty percent (50%).

TABLE 1

| Surfaces | Composite RMS Roughness $\sigma$ ($\mu$m) | $\lambda$ Ratio (Film Thickness) | Maximum Pressure $P/P_h$ | Maximum Subsurface Shear Stress $\tau_{max}P_h$ | Contact Load Ratio $W_c$ | Coefficient of Friction | Maximum Surface Temperatures (° C.) |
|---|---|---|---|---|---|---|---|
| Hobbed & Shaved | 1.2976 | 0.2637 | 4.382 | 0.6566 | 0.5901 | 0.06858 | 291.5–285.8 |
| Ground | 1.6193 | 0.1688 | 5.087 | 0.3759 | 0.6315 | 0.07289 | 267.8–264.3 |
| Honed | 0.8813 | 0.3679 | 5.597 | 0.3487 | 0.3657 | 0.04994 | 231.2–225.0 |
| Fine Grit Honed | 0.8463 | 0.4405 | 3.076 | 0.3234 | 0.3235 | 0.04929 | 194.1–186.4 |
| Physicochemically Polished I | 0.4542 | 0.5806 | 2.537 | 0.3168 | 0.2234 | 0.04356 | 141.8–140.5 |
| Physicochemically Polished II | 0.4137 | 0.6071 | 2.508 | 0.3144 | 0.2138 | 0.04215 | 123.6–120.8 |
| Electrochemically Polished | 0.2161 | 1.0413 | 1.771 | 0.3140 | 0.0937 | 0.03446 | 105.7–105.1 |
| Smooth | 0.0 | infinity | 1.013 | 0.3130 | 0.0 | 0.02679 | 52.6–50.4 |

FIG. 3 shows a perspective of a surface with traditional hobbed and shaved surface finish. In the figure, Ra is the arithmetic mean roughness, Rq is the root mean square of the roughness, or $\sigma$, and Rz is the maximum peak to valley measurement. The Ra is approximately 0.6988 $\mu$m, or approximately 25.5 micro-inches, and Rq is approximately 0.8864 $\mu$m, or approximately 34.9 micro-inches.

Figure 4:
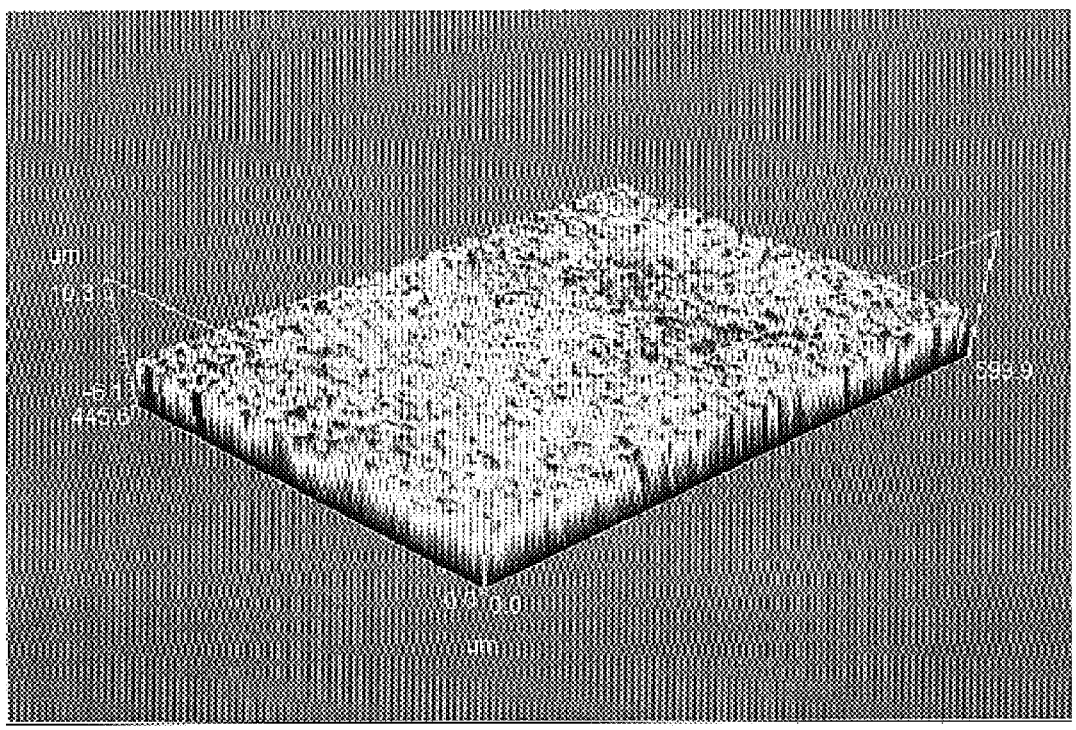
FIG. 4 shows a perspective of a surface following physicochemical polishing.

FIG. 4 shows a perspective of a surface following physicochemical polishing. Here, following treatment to polish the surface of the gear teeth, the Ra is approximately 0.1987 $\mu$m, or approximately 7.82 micro-inches, and Rq is approximately 0.304 $\mu$m, or approximately 11.97 micro-inches.

The result of polishing the surface of the gear is an enhanced surface with reduced surface irregularities.

In the preferred embodiment, a gear surface is finished, or polished, to between approximately 5 micro-inches Ra and 10 micro-inches Ra. Any metal gear can be used, and the surface to be finished or polished is preferably the gear functional surface. The gear functional surface is also known as the surface of the gear teeth that contact gear teeth of another gear. Any gear size is suitable, including transmission gears having approximately 3 to approximately 8 teeth per inch diameter to gears greater than 8–10 teeth per inch diameter. Additionally, the finished or polished surface topgraphy can be isotropic or non-isotropic.

While advantageous embodiments have been chosen to illustrate the invention, it will be understood by those skilled in the art that various changes and modifications can be made therein without departing from the scope of the invention, as defined in the appended claims. For example, the gear can be finished or polished using any known method, for example, electrochemical polishing, mechanical super finishing, mechanical abrasive polishing, and chemically accelerated vibratory polishing. The actual polishing or finishing used does not matter so long as the finish is relatively uniform and between approximately 5 to approximately 10 micro-inches. Additionally, it is preferable that the finishing or polishing process does not negatively effect the geometric shape and function of the gear teeth.

What is claimed is:

1. A lubricated gear set, comprising:
   a first gear having a first surface finish and including a first lubrication film thickness; and
   a second gear engaging said first gear and having a second surface finish different from said first surface finish, said second gear including a second lubrication film thickness different from said first lubrication film thickness;
   wherein said first surface finish has an arithmetic mean roughness of approximately 3 micro-inches to approximately 12 micro-inches.

2. The gear set of claim 1, wherein said first or said second gear is selected from a spur gear, an internal gear, a helical gear, a herringbone gear, a bevel gear, a worm gear or a planetary gear.

3. The gear set of claim 1, wherein said first surface finish has an arithmetic mean roughness of approximately 5 micro-inches to approximately 10 micro-inches.

4. The gear set of claim 1, wherein said second surface finish has an arithmetic mean roughness outside of the range of approximately 3 micro-inches to approximately 12 micro-inches.

5. The gear set of claim 4, wherein said second surface finish has an arithmetic mean roughness greater than approximately 12 micro-inches.

6. The gear set of claim 4, wherein said second surface finish has an arithmetic mean roughness less than approximately 3 micro-inches.

7. The gear set of claim 4, wherein a lubricant is disposed between said first gear and said second gear, and wherein said first and second surface finishes are adjusted such that a total wear reduction between said gears is optimized to permit the continued presence of said lubricant.

8. A gear set, comprising:
   a first gear engaging a second gear,
   a first wear reduction means employing a lubricant having a film thickness; and
   a second wear reduction means employing a first surface finish on one of said first and second gears, and a second surface finish on the other said gears, wherein said second surface finish is different from said first surface finish, and; wherein said film thickness is dependent upon the roughness of said first surface finish and optimized when said first surface finish has an arithmetic mean roughness of approximately 3 micro-inches to approximately 12 micro-inches.

9. The gear set of claim 8, wherein said first or said second gear is selected from a spur gear, an internal gear, a helical gear, a herringbone gear, a bevel gear, a worm gear or a planetary gear.

10. The gear set of claim 8, wherein said first surface finish has an arithmetic mean roughness of approximately 5 micro-inches to approximately 10 micro-inches.

* * * * *

UNITED STATES PATENT AND TRADEMARK OFFICE
CERTIFICATE OF CORRECTION

PATENT NO.   : 6,732,606 B1
DATED        : May 11, 2004
INVENTOR(S)  : Dong Zhu et al.

It is certified that error appears in the above-identified patent and that said Letters Patent is hereby corrected as shown below:

<u>Column 6,</u>
Line 17, insert -- of -- after "other"
Line 20, delete ";" after "and"

Signed and Sealed this

Seventh Day of September, 2004

JON W. DUDAS
*Director of the United States Patent and Trademark Office*